United States Patent [19]
Nakahashi et al.

[11] Patent Number: 5,269,977
[45] Date of Patent: Dec. 14, 1993

[54] METHOD OF MANUFACTURING A FOAM TRANSPARENT ORGANIC GLASS PLATE

[75] Inventors: Sumio Nakahashi, Saijo; Erika Hagiyama, Niihama; Takao Iino, Takatsuki; Fukuichi Morizane, Niihama, all of Japan

[73] Assignee: Nissen Kagakukogyo K.K., Niihama, Japan

[21] Appl. No.: 639,422

[22] Filed: Jan. 11, 1991

[30] Foreign Application Priority Data

| | | |
|---|---|---|
| Jan. 12, 1990 [JP] | Japan | 2-4690 |
| May 17, 1990 [JP] | Japan | 2-52066[U] |
| Jun. 4, 1990 [JP] | Japan | 2-146522 |
| Oct. 30, 1990 [JP] | Japan | 2-294456 |

[51] Int. Cl.$^5$ .................... B29D 11/00; B29C 67/20
[52] U.S. Cl. ...................... 264/1.9; 264/1.1; 264/41; 264/45.3; 264/50
[58] Field of Search ........... 264/1.1, 1.6, 1.7, 1.9, 264/45.3, 41, 50

[56] References Cited

U.S. PATENT DOCUMENTS

| | | | |
|---|---|---|---|
| 2,143,946 | 1/1939 | Hunter | 264/1.9 |
| 3,454,332 | 7/1969 | Siegel | 264/1.7 |
| 3,694,246 | 9/1972 | Purcell et al. | 264/1.1 |

FOREIGN PATENT DOCUMENTS

| | | | |
|---|---|---|---|
| 4853 | 2/1973 | Japan | 264/1.6 |
| 41961 | 10/1981 | Japan | 264/1.1 |

*Primary Examiner*—James Lowe
*Attorney, Agent, or Firm*—Edwin E. Greigg; Ronald E. Greigg

[57] ABSTRACT

A light reflective body useful for a panel-type lighting or ornamental member with edge lighting is formed of a transparent inorganic or organic casted glass member, such as a transparent plate of polymethyl methacrylate which has foam layers unevenly dispersed in the inner or outer face of the member or plate. The organic casted glass member of the light reflective body is manufactured by (a) gelling organic glass beads and an organic glass monomer or prepolymer or a mixture of them and thereafter casting them with an organic glass monomer or prepolymer or a mixture of them in a framework; (b) spreading the foaming material on a ready-made organic glass plate and hardening it; or (c) tightly attaching an organic glass foam plate manufactured in advance to an organic glass plate. In accordance with the method (a) or (b), the foam layer is completely integral with the organic casted glass product. Method (c) can also be applied to an inorganic casted glass member.

13 Claims, 9 Drawing Sheets

METHOD OF MANUFACTURING A FOAM TRANSPARENT ORGANIC GLASS PLATE

TECHNICAL FIELD

The present invention relates to a surface reflective body, such as improved light reflective body or a surface lighting body, useful for a back light for a display, a signboard, an ornamental body, a liquid crystal display or a television monitor, a light for observingly or appreciatively looking over negative and positive film or for copying drafts and animation original drawings and a shadeless lamp for surgical operation; to a method of manufacturing the surface light reflective body; and to use for the surface light reflective body in the above-mentioned fields.

BACKGROUND ART

Because of the excellent transparency, surface luster, coloring, weather resistance and the like, a transparent resin plate of polymethyl methacrylate, methyl methacrylate, styrene copolymer, polystyrene or the like is used as an ornamental body, such as a signboard, a display and the like, or a roofing member when transparent, or also widely used as a signboard, a billboard, a lightening shade, etc. because of a scattered light permeability when milky in color due to white pigment added to the resin. Especially, a polymethyl methacrylate plate for the former use is significantly excellent in the above-mentioned characteristics and is used most in general.

Many electrical engineers have long aimed great efforts at the development of a surface light emitting body. An electroluminescent (EL) light emitting device utilizing electric fluorescence has already been developed; however, it has not yet been appropriate in practical use because its luminance per unit area is insufficient. Hence, as a surface lightening body, a device in which a light source like a fluorescent lamp is shaded by a light scattering plate of opal glass or cloudy plastic is mainly used.

To still more enhance an ornamental effect of a sheet of the above-mentioned transparent resin, especially a light permeability and a light diffusivity, Japanese Examined Patent Publication No. 16138/1977 discloses a method in which an acrylic resin plate is molded in a foam sheet by forcing the raw material charged with an adequate amount of water to heat up and foam. In accordance with the prior art technique, however, the resultant foam sheet loses a surface smoothness because the foam generated by heating makes concavities and convexities in the surface, and additionally, the inside of the foam is also lacking in smoothness and luster; as a result, the light of incidence on the surface of the sheet immediately attenuates. Thus, the foamed sheet is not suitable for edge lighting; the only thing expected is a scattering effect of the light incident on the sheet. In other words, even if the sheet is used for the purpose of edge lighting, the sheet never shine evenly throughout the surface orthogonal to the incident light by virtue of the foam.

In the above-mentioned surface lighting device, the luminance becomes even as the distance between the light source and the light scattering plate is longer; however, since the luminance is inversely reduced proportional to the distance raised to the second power, the device must have a somewhat complex system design where the distance between the light source and the light scattering plate is long to some extent and the light source consists of a plurality of illuminants appropriately arranged, to harmonize the two contradictory conditions, namely, unifying the luminance and decreasing in brightness.

SUMMARY OF THE INVENTION

The present invention is directed to a light reflective body comprising a foam plate which is made of a transparent organic casted glass body containing masses of many small bubbles; and an inorganic or organic casted glass body; the foam plate and the inorganic or organic casted glass body being integrally formed.

The present invention is also directed to a method of manufacturing a light reflective body having a transparent organic molded glass body in which masses of many small bubbles are dispersed unevenly. According to the present invention, the method comprises the steps of mixing organic glass monomer or prepolymer, or a mixture of them with resin grains, or beads of said monomer, and gelling the mixture; and integrally hardening the gelled mixture with a fluid organic glass body of the same kind, while the gelled mixture is in a cell.

Furthermore, the present invention is directed to a method of manufacturing an organic foam glass plate, comprising the step of polymerizing organic glass monomer to which beads of organic glass are added or prepolymer, or a mixture of them in a cast under an ordinary pressure.

In another aspect of the present invention, a method of manufacturing a light reflective body comprises the steps of spreading a thermosetting fluid mixture of organic glass monomer and/or prepolymer or a mixture of them, and granular polymer of said monomer on a plate of transparent organic glass of the same kind; hardening the fluid mixture; and making it integral with the glass plate.

The present invention is also intended for a use for a light reflective body, characterized in that a molded body composed of a transparent organic molded glass body in which masses of many small bubbles are unevenly dispersed is applied to a surface lighting body, various types of ornamental body, a window pane, a screen, a lamp shade, stained glass, etc.

The present invention is further intended for a surface lighting body comprising a molded body composed of an organic molded glass body in which masses of many small bubbles are unevenly dispersed and a light reflecting layer on the back face of the organic molded glass body. The surface lighting is characterized in that a linear light source is positioned in at least one side of the molded body.

Accordingly, it is an object of the present invention to provide a foam translucent body having smooth surfaces, particularly, an improved light reflective body or a surface lighting body which is excellent in light diffusivity and two-dimensional light permeability and particularly which is useful, when utilized as a surface reflecting panel, for a back light for a display, a signboard, an ornamental body, a liquid crystal display or a television monitor, a light for observingly or appreciatively looking over negative and positive film or for copying drafts and animation original drawings and a shadeless lamp for operation. The present invention also provides a surface light employing the above-mentioned foam translucent body.

It is another object of the present invention to provide an ornamental light reflective body having an arbitrary pattern.

It is still another object of the present invention to provide a method of manufacturing the light reflective body on an industrial basis.

These and other objects, features, aspects and advantages of the present invention will become more apparent from the following detailed description of the present invention when taken in conjunction with the accompanying drawings.

DETAILED DESCRIPTION OF THE INVENTION

The inventor, as a result of the research, has found that a light reflective body or a surface lighting body which assumes a uniform light scattering effect along a face orthogonal to the incident light may be implemented using a transparent organic molded glass body which has masses of many small bubbles unevenly dispersed inside or outside of it; the inventor has enthusiastically developed the manufacturing means on an industrial basis. The invention will be discussed in detail hereinafter.

Organic glass employed for a light reflective body of the present invention includes, for example, polymethyl methacrylate, methyl methacrylate, styrene copolymer, polystyrene, etc.; the polymethyl methacrylate is the best material excellent in transparency, luster, weather resistance and the like.

A foam light reflective body according to the present invention is desirably plate-shaped with uniform thickness in general. A plate like a wedge in section with uneven thickness is preferably employed as a light conducting plate for a liquid crystal display. If desired, it may have an arbitrary shape, for example, a curved plate, a hollow cylinder, a solid cylinder, a circular cone, an elliptical cone, a rectangular solid, a pyramid, a sphere and the like. It is characterized in that many small bubbles are unevenly dispersed inside or outside of it along a length of the glass plate.

Figure 22:
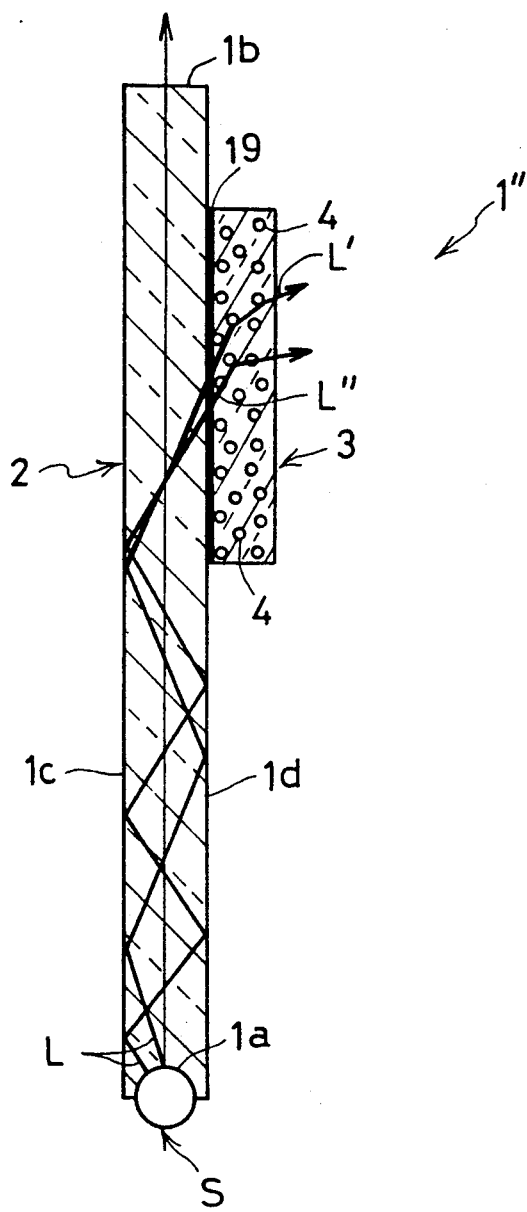
FIG. 22 is a schematic sectional view showing the principle of light reflection employing an affixed foam plate.

"Unevenly dispersed" means, as shown in FIGS. 1 through 5 and FIGS. 22 through 24 of the accompanying drawings, that bubbles 4 exist in the whole extension of one major surface of a transparent body 2 (FIG. 1) or in a part (FIGS. 2 and 3), or in the whole extension of the center part (not precise in words) (FIG. 4) or in a part (FIG. 5), or that a foam plate 3 containing the bubbles 4 extends along the body 2 (FIGS. 22 though 24). The above configurations exert an excellent light scattering effect as surface reflective members, respectively; however, the configurations shown in FIGS. 1 through 3 and FIGS. 22 through 24 are advantageous from an aspect of manufacturing.

Figure 2:
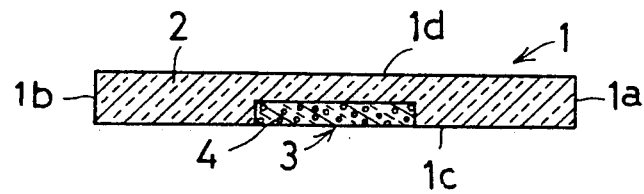
Figure 3:
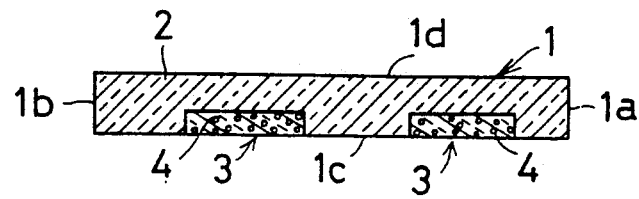
Figure 5:
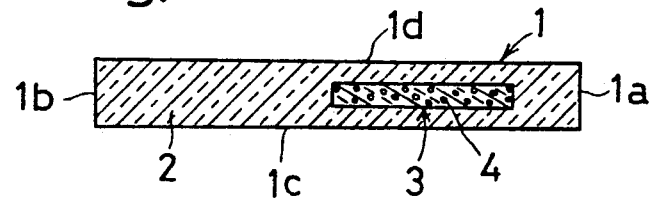

As discussed in the description of the preferred embodiments presented later, in the embodiments shown in FIGS. 2, 3 and 5, a mass (foam mass) 3 of the bubbles 4 can make the shape of an arbitrary character, figure, symbol, pattern, etc.; this presents a unique effect of beauty.

The bubbles 4 are preferably separate and spherical in shape with diameter 0.1–2 m/m, preferably, about 0.2–1 m/m. Especially, the bubbles 4 desirably have smooth inside walls. When the body according to the present invention is formed in a plate, the thickness of the masses of bubbles (foam layer) is preferably in a range of 1/10 through ⅔ of the overall thickness of the body. When the light from the light source is incident merely on one surface of the body, it is desirable that the foam or the foam layer becomes gradually larger in density or in thickness as it goes from the side on which the light incident to the side from which the light is released.

Figure 1:
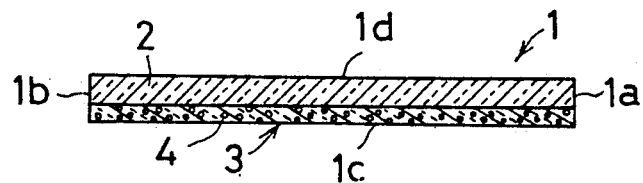
FIGS. 1 through 5 are schematic sectional views showing various configurations of a light reflective body according to the present invention.
Figure 4:
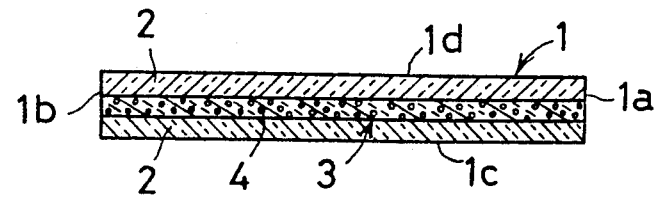

If the objective is simply to use the present invention as a lighting body or light of a surface light emitting type, the configurations shown in FIGS. 1 and 4 are preferable. The masses of bubbles may be a separate molded body having the shape of a plate and bonded to a transparent inorganic or organic glass plate generally by an adhesive agent of the same kind as the organic glass plate (see FIG. 24). In this method, a disadvantage arises in that the light reflective body manufactured according to this method is somewhat less in illuminance, compared with the embodiments shown in FIGS. 1 through 5. On the contrary, however, a foam plate manufactured in another way is cut off into the shape of a desired character, figure, etc. and affixed to a transparent inorganic or organic glass base plate; consequently, this is advantageous in mass production.

Figure 14:
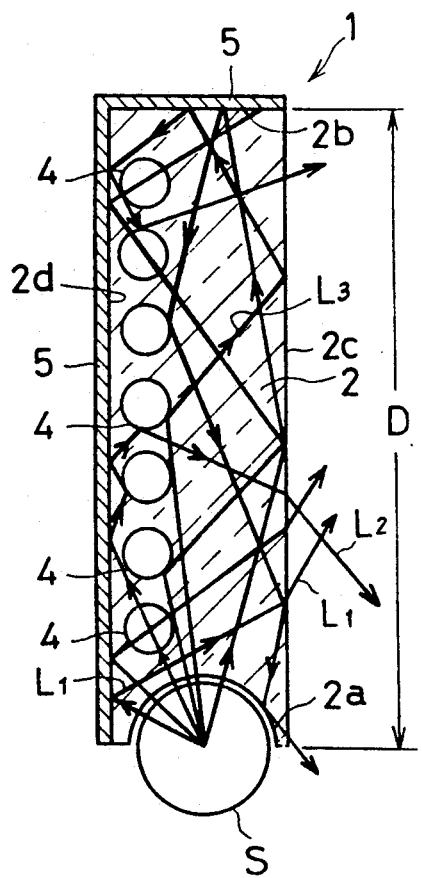
FIG. 14 is a schematic sectional view for explaining the principle of surface lighting according to the present invention.
Figure 15:
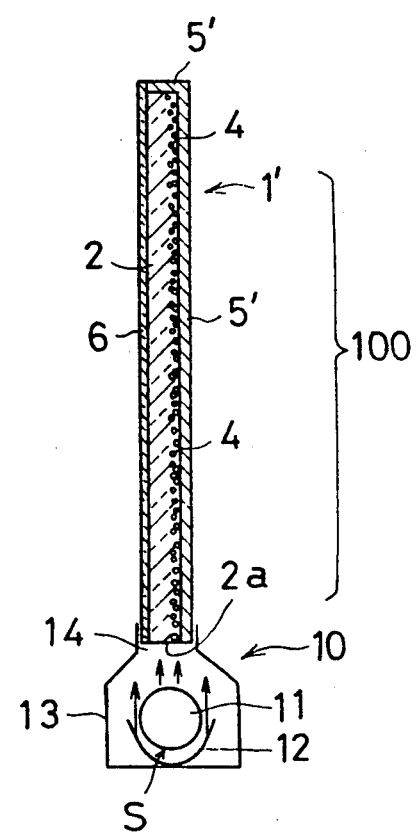
FIG. 15 is a cross-sectional view showing an example of a light according to the present invention.

The light reflective body according to the present invention desirably carries a light reflecting layer on the rear face of its organic molded glass member (see FIGS. 14 and 15). The light reflecting layer is not essential in the intended use, but effective to enhance a lighting effect (luminance). The reflecting layer may be a mirror attached to the overall surface on one side of the molded member, or a fine-grain metal layer or mirror of aluminum or the like deposited on the overall surface of one side of the molded member by spattering or ionplating. In this case, desirably, there is substantially no gap between the plated or deposited metal layer and the molded member so as to enhance a reflective efficiency. The surface of the organic glass molded in a framework of polished plate glass is substantially a mirror surface; hence, a thin reflective film tightly attached to the surface of the molded member by means of vaporization, electroless plating or the like is the best in efficiency.

Rays emitted by the lighting body according to the present invention (mainly recognized as a brightness of the charged bubbles) are an assembly of various unit lights of phases different to each other, and therefore, they seem to glitter if left as they are. Then, it is desirable that a thin light scattering film is affixed to the surface of the body to scatter the released light (see FIG. 15).

Since the body according to the present invention functions in accordance with the principle of edge lighting, a light source may be preferably a fluorescent lamp, namely, a hot-cathode fluorescent discharge lamp (ordinary fluorescent lamp), or a cold cathode fluorescent discharge lamp; the latter, or the cold cathode type, is especially suitable from an aspect of the objective of the present invention. This is because the cold cathode type lamp can be made smaller in diameter 6 m/m$\phi$ or under, and additionally, it has not filament in it, so that the temperature of the light source never rise. It should be noted, however, that D.C. high supply voltage similar to a neon tubing must be prepared because the lamp cannot be turned on by ordinary 100 V A.C. Furthermore, an extension equipments like a parabolic reflective mirror, a capacitor, etc. should be provided, as required, to regulate the rays emitted by the light source as parallel to one another as possible. Spot light sources of high color temperature, such as xenon lamps or krypton lamps, might have an effect almost the same as a linear light source, if disposed parallel to one another. Thus, the term "linear light source" substantially means an alignment.

As desired, a high refractive material, such as micro capsules containing lead glass beads, crystalline zirconia or $\alpha$-bromenaphthalene, and an additive, such as a transparent pigment, a fluorescent pigment or a phosphorescence of alkaline earth metal sulfide, can be added to a material for making foam or a material for making a transparent layer. It is also possible to provide a linear hollow portion in accordance with a method disclosed in U.S. Pat. No. 4,830,199 which was obtained by applicant.

By virtue of the above-mentioned means, the resultant body can be interspersed with star-like brightness, various types of fluorescent light can be created in a foam layer in accordance with the wavelength of the incident rays, linear brightness can be added, or phosphorescence can be produced in accordance with the light turning off when the light source comes on and off; as a whole, ornamental effects can be more and more enhanced.

The light reflective body or the surface lighting body according to the present invention can be manufactured in any of the ways (A) through (C): (A) Using a Framework, (B) Without Using a Framework and (C) Affixing.

(A) This method is suitable for unevenly dispersing masses of bubbles (as the shape of a character, a symbol, a figure or the like) in the overall surface of, the entire region inside or a partial region inside a transparent organic glass base plate; the masses of bubbles completely come to be integral with the organic glass plate. Specifically, a foaming or foamable material consisting of beads of polymethyl methacrylate and methyl methacrylate or prepolymer of it is hardened with non-foaming molded material of the same kind in a framework (an assembly usually of two polished glass plates disposed through a gasket in parallel to each other). Not to mix the former foaming or foamable material with the non-foaming (deaerated) molded material, the former must be preliminarily polymerized to some extent before pouring the latter to transform it at least into gel like gelled agar. Thus, the preliminary polymerization into gel is carried out in a separate adequate cast to create foam molded body having the shape of an arbitrary character, figure, symbol or pattern in accordance with the inner contours of the cast; moreover, the molded body, mounted on the glass surface of the framework (cell), hardened integrally with the deaerated molded material to create a molded body including a foam layer which has the shape of an arbitrary character, figure, symbol or pattern on the overall surface (see FIGS. 2 and 3). As desired, the cast is directly disposed in an arbitrary position on the cell surface.

On the other hand, if the gel is similar to the cell in shape and dimensions (i.e., if the material can be gelled directly on a cell plate without using a framework—instead, a bank must be built up to dam up the material on the cell plate), the resultant molded body is a foam layer overlaid with a transparent foam free layer (see FIG. 1). Moreover, a foam body is throughout or partly superimposed on the transparent foam free layer that is hardened not to intermingle with another material (after the foam layer is hardened into gel if it is not gelled); furthermore, a deaerated molded material is poured and hardened. Thus, obtained is a product having a configuration like sandwich or multi-strata where a foam resin layer is interposed between transparent resin layers (see FIGS. 4 and 5).

In the method (A), it is significant to use beads (beads) as a subsidiary material in order to smoothly make foam (produce bubbles).

For example, when a polymerization initiator is used for a radical polymerization of the above-mentioned methyl methacrylate, a phenomenon termed in kinetics automatic accelerator effect (Trommsdorf effect) arises, and consequently the reaction speed (Rp) natural logarithmically increases after the lag phase at the initial stage of the polymerization. Since this increase in a viscosity is raised rapidly in the later lag phase, the control of the polymerization becomes very difficult, even though air bubbles could be entrapped into the reacting casting material by stirring in the viscosity raising stage.

Figure 18:
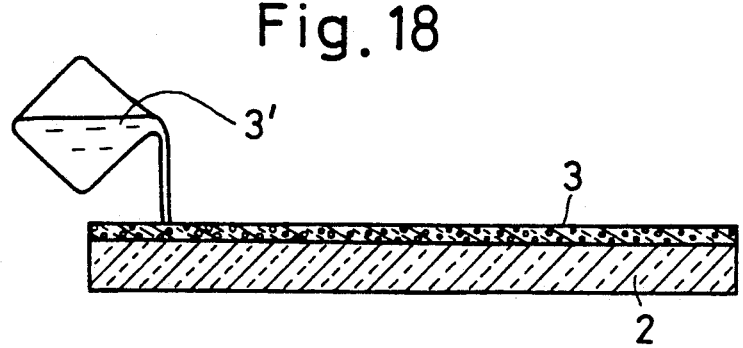
FIGS. 18 through 21 are schematic views showing manufacturing steps of the light reflective body according to the present invention and its configuration of the intended light reflective body.
Figure 21:
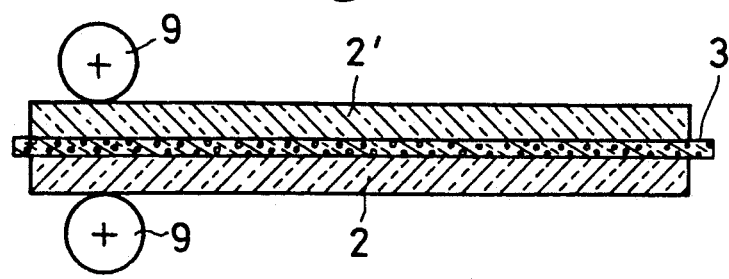

On the contrary, it has been determined that polymerized beads have air absorbed in cracks in their surface and also air is captured on the surface and between the polymerized beads when the beads are added to the material for making a foam when polymerized beads are used, the air between bead-particles and the air attached to or adsorbed by cracks in the surface or inside the particles serve as a nuclei for producing bubbles, or they are released as the beads are dissolved in the monomer, etc. to form bubbles in the resultant hardened molded body. At the same time, the swelling and dispersion of the beads cause a virtual viscosity to rise, so that the escape of the air released from the beads is inhibited. In this way, as well as the way of the loading of air by the stirring, the polymerized material can be uniformly charged with a required amount of air in the period of the lag phase. Thus, the dispersion of bubbles as intended by the present invention can be easily attained. It can be said that the beads in this process serve as a trigger (an inducer) for forming bubbles. Allowing for the principle of this action, the rising effect in virtual viscosity should get larger as the particle diameter of each of the beads is small to some extent; however, if the particle diameter is too small, a mass of bubbles cannot be uniform and right spherical in shape when dispersed. Practically, the beads are selected among those which are 10–2000 μm in average particle diameter, or preferably, 40–1000 μm. A factor of the molecular weight of the beads is also related to the quality of the produced bubbles; generally, the beads of MFI 0.1–30 (under the conditions of 230° C. and load 3.8 kg) are preferable to obtain bubbles uniform and right spherical in shape. With regard to a mixture of the granular polymethyl methacrylate (beads) and the MMA monomer or its prepolymer, the rate of the former is preferably approximately 30–80% by weight. When the rate of the beads is less than 30% by weight, it is difficult to keep a specified shape because the gelled agar is insufficient in plasticity; contrarily, when it is 80% by weight or over, it is difficult to obtain a uniform foam body. However, to obtain a simple multi-layer body as shown in FIGS. 18 and 21, the rate of the beads may not be precisely limited to the above-mentioned lower limit.

The foam organic glass plate is formed by the following steps:
1. Mixing liquid organic glass material selected from the group consisting of organic glass monomer, prepolymer thereof and a mixture of said monomer and said prepolymer with resin grains (=beads) of said monomer;
2. Changing the mixture obtained in the above step 1 to a gelled mixture like jelly which contains masses of many small even disposed bubbles by maintaining an even density of the beads in the mixture, for example, by stirring the mixture which disperses the liquid organic glass material into gaps between compacted beads; and
3. Hardening the gelled mixture into a foam organic glass plate by polymerizing the organic glass material.

(B) Method without Using a Framework
(a) Spread Mixture

According to this method, the light reflective body or lighting body of the present invention is manufactured by spreading a thermosetting fluid mixture consisting of organic glass monomer and/or prepolymer or a mixture of them and granular polymer (trigger) of the monomer, preferably, a thermosetting fluid mixture (foam mixture) consisting of beads of polymethyl methacrylate and methyl methacrylate or its prepolymer or a mixture of them, over a transparent organic glass plate of the same kind (preferably, a polymethyl methacrylate plate), hardening it and making it integral with the transparent organic glass plate. The foam mixture to be spread preferably has a viscosity (ordinarily, about 50–100 cp) in which the mixture can spontaneously spread; hence, it is preferable that the foam mixture is preliminarily polymerized to some extent before the spreading. If the viscosity of the mixture is so high that, for example, it should be pressed by rollers to spread, it is likely that the mixture might be transformed or coagulated because of foam compression; hence, excessive preliminary polymerization should be avoided. If it is intended that a foam layer should have the shape of an arbitrary character, figure, symbol, pattern, etc., a viscosity should be assumed to an extent that the mixture never lose the shape (e.g., gelled agar).

Moreover, the foaming mixture is not always initially necessary in the state of the composition, but the same object can be attained by two-stage method. In this two-stage method, a monomer, prepolymer or the mixture thereof having an adequate viscosity is spread on an organic glass plate, and then beads are sprinkled over the spread material. The two-stage method is particularly effective when an arbitrary character, figure, symbol, etc. should be shaped on the organic glass plate.

In the method previously mentioned, it is significant that beads are used as a subsidiary material to smoothly attain foaming (producing bubbles).

In the method according to the present invention where polymerized beads are used as a trigger, the resin allows the virtual viscosity of the mixture to rise to a level appropriate to the spreading; additionally, since a very small amount of bubbles charged between unit resin particles of which each bead is formed is released into a system as minute bubbles as the resin is swelled, the minute bubbles are dispersed uniformly without stirring. Such a state is never implemented by stirring. Empirically, the beads added herein are selected among those that are 10–2000 μm in average particle diameter, preferably, 40–1000 μm. A factor of the molecular weight of the beads is also related to an air carrying effect; generally, the beads of MFI 0.1–30 (under the conditions of 230° C. and load 3.8 kg) are preferable to obtain bubbles uniform and right spherical in shape. With regard to the foam mixture of the granular polymethyl methacrylate (beads) and the MMA monomer or its prepolymer, the rate of the former is preferably approximately 30–80% by weight. When the rate of the beads is less than 30% by weight, it is difficult to spread the mixture with an appropriate thickness because the viscosity is insufficient; contrarily, if it is 80% by weight, it is difficult to spread it.

(b) Spreading

Figure 19:
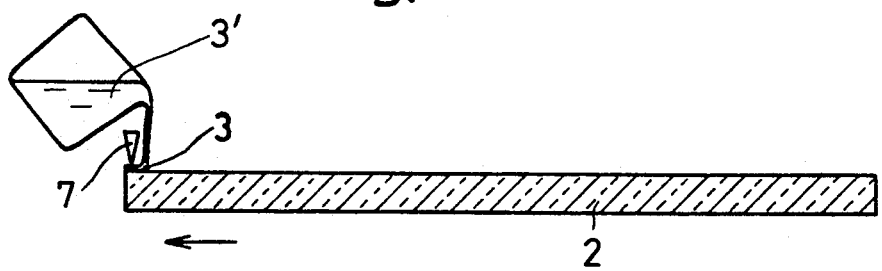

Refer to FIGS. 18 through 21. A foam layer 3 is formed basically by spreading a foam mixture 3' as discussed above over a purified organic glass plate 2 as shown in FIG. 18. If the viscosity is appropriate, the foam layer 1 is formed substantially with a uniform thickness without any treatment or by leveling it with a doctor knife, for example. In a large scale, as shown in FIG. 19, the organic glass plate, while it is in horizontal uniform motion, is passed under a fixed doctor knife 7 to level the mixture. Moreover, when a pattern is drawn in the foam mixture 3' of which viscosity is appropriately regulated when the mixture 3' is spread, obtained is a product including a foam layer of an arbitrary pattern. As another method of manufacturing a foam layer, for example, a predetermined pattern is drawn in monomer or prepolymer of viscosity as low as can be treated with an injector, for example, and thereafter, granular polymer may be sprinkled into the pattern layer. This method is not merely practically suitable, but is advantageous in that the drawn pattern is naturally edged with picturesque dim light.

Figure 20:
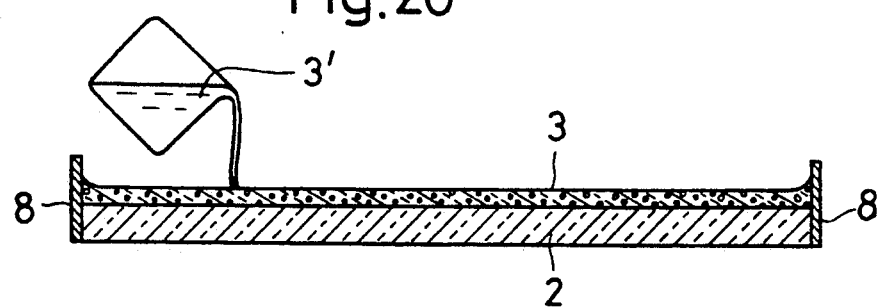

As desired, as shown in FIG. 20, a dam plate 8 of a specified height is provided surrounding an organic glass plate 2, so that a foam mixture can be poured into a space dammed up by the plate 8. As a variation of this method, a dam plate (cast plate) for molding in accordance with the contours of a character, figure, symbol, etc. may be placed on an organic glass plate; then, a foam mixture may be poured into a space defined by the cast plate, so that a foam layer having the shape of an arbitrary character or the like can be formed.

Figure 8:
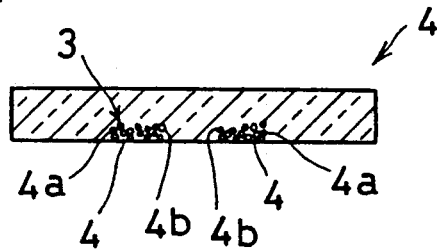
FIG. 8 is a sectional view taken along the line 8—8 of FIG. 7.

As another variation of the method, as shown in FIG. 21, an organic glass plate 2 overlaid with a foam layer 3 in a way as shown in FIG. 8 is further overlaid with another organic glass plate 2', and the multi-layer plate is lightly pressed by rollers 9. According to this method, a multi-layer body having a configuration like sandwich can be easily formed with uniform thickness; in addition to that, as a result of a pressurization of the rollers, an air layer interposed between both the organic glass plates 2, 2' and the foam layer 3 serving as a core is dissolved in the layer 3 and vanishes. Thus, a uniform foam organic glass plate can be formed. The organic glass plate 2' is polymerized without any trouble by keeping the foam layer 3 oxygen free without inert gas such as $N_2$.

(c) Polymerization

In the method (B), unlike a conventional method of polymerizing in a cell, the foam layer, being exposed to air, is polymerized and hardened. This is advantageous from an aspect of convenience, but disadvantageous in not only that the polymerization speed is lowered because of an influence of the oxygen but that minute concavities and convexities are created in the surface of the hardened foam layer, and consequently, the foam layer looks like frosted glass. Hence, if possible, it is desirable to polymerize a foam mixture under oxygen free atmosphere like a nitrogen gas atmosphere. Further, as shown in FIG. 4, it is also effective for a smooth polymerization that a foam layer is overlaid with another organic glass plate (or possibly with an inorganic glass plate), and then polymerized under the condition that the air flow is blocked.

A time required for establishing the foam layer is determined dependent upon a thickness of the foam layer, and in usual, as long as 2-3 hours under the room temperature, or as short as 30 minutes at 30° C. However, since the polymerization speed gets exponentially lowered in the finishing period as the polymerization proceeds, heating and annealing should be essential for the completion of the polymerization.

(C) Affixing

According to this method, preferably, a foam body consisting of beads of polymethyl methacrylate and methyl methacrylate or its prepolymer is hardened in a framework (usually, a couple of polished glass plates are disposed through a gasket in parallel to each other); thereafter, an arbitrary shape corresponding to the contours of a predetermined character, figure, etc. is cut out. The cutout foam plate is tightly attached to the surface of a transparent plate 2 as shown in FIG. 22.

The foam body can be cut out by any means, and preferably, a numerical control type laser cutter may be used from an aspect of mass production. To hold the foam plate tightly, an adhesive agent is preferably used. Practically there is no problem in an existence of a minute gap in the junction surface, but it is desirable that the transparent plate 2 and the foam plate 3 are substantially tightly attached through an adhesion agent layer 19 similar to the plates 2 and 3 in characteristic (identical in refractive index) not to happen to cause a total reflection in the interface between those plates (see FIG. 22); hence, if the plate 2 and the foam plate 3 are made of polymethyl methacrylate, resin for the adhesion agent may be of preferably polymethyl methacrylate.

The organic foam glass plate (foam plate) employed herein is obtained by polymerizing liquid material composed mainly of appropriate molded resin including organic glass beads and a polymerization catalyst in a framework having an appropriate shape and then hardening it. Thus, specifically, variations of the method will be presented below (see the previous description in (B)–(a)).

(a) A method in which a mixture of organic glass beads with deaerated molded resin to which an additive agent like catalyst is added in advance is prepared in a molding framework (cell), and the mixture, being heated from outside to cause the organic glass beads to dissolve and swell, is polymerized.

(b) A method in which after a deaerated material of molded resin to which an additive agent like catalyst is added in advance is prepared in a cell, the cell is charged with heads; and then, the mixture in the cell is hardened in the manner similar to (a).

(b) A method in which a cast under a low temperature is charged with beads in advance, cold monomer is poured into the cast keeping a reduced pressure and low temperature, and then the mixture in the cast is hardened in the manner similar to (a).

In the present invention, the optimum method in the above variations may be selected in accordance with a uniformity of foam in the intended product, a size and density of contained bubbles, and a thickness of the product.

According to the method (a), a mixture rate of the beads to the monomer can be varied at any discretion; additionally, the foam dispersion in the product can be uniform. On the contrary, according to the methods (b) and (c) where the molded material in the cell is charged with the beads or the molded material is added to the beads, it is difficult to obtain a product uniform in foam dispersion because of a difference of specific gravity between the beads and the molded material (especially, the monomer). In the method (b), however, when a loading rate of the beads is enhanced to around 75% that is the upper limit of the above-mentioned moderate rate, the foam dispersion in the product can be almost uniform. Further, in the method (c), the amount rate of the charged beads can be around 62.5%, but the material is likely to be gelled in the middle of loading the beads. Thus, the method (c) is suited to manufacturing a molded foam body of relatively small in size about 10 cm in one side, but not to manufacturing a molded body of latger size.

Thus, apparently the most general in practical use is the method (a) where a mixture of organic glass beads with deaerated molded resin to which an additive agent like catalyst is added in advance is prepared in a molding framework (cell), and the mixture, being heated from outside to cause the organic glass beads to dissolve and swell, is polymerized. In any ways, the temperature in preparing a polymerized material (temperature in preparation) is preferably as low as possible.

As for the cell, generally used is that which has two polished glass plate disposed through a flexible gasket of, for example, polyvinyl chloride in parallel to each other to produce a molded body having the shape of a plate. To produce a molded body of different shapes, such as an arc, a cylinder, a pyramid and the like, a cast corresponding to the desired shape must be prepared. A main organic foam glass molded body according to the present invention has the shape of a plate of various contours; most generally used is a body that is molded into a plate using a cell.

Preferably, the diameter of each bubble is in a range of 0.1-2.0 m/m$\phi$. In general, generated bubbles get smaller in diameter as the pressure in molding is higher; the generated bubbles get larger in diameter and the number of them is reduced as the employed organic glass beads bet larger in particle diameter. Moreover, the bubbles get smaller in diameter as the concentrations of the prepolymer and polymer (derived from the organic glass particles) in the molded material get higher. Further, the number of the bubbles tends to get larger as the temperature in polymerization rises. Accordingly, in practically manufacturing an organic molded foam glass body, it is preferable that the conditions like a diameter of the employed organic glass beads, a charged amount of the beads (mix proportion to the molded material), a reaction temperature, etc. are under the control in accordance with the purpose. Especially, pressure in molding exerts great influence on the particle diameter, and therefore, a reaction is preferably carried out under an ordinary pressure.

A light reflective body or a surface light according to the present invention is useful for light reflecting element because it has a characteristic that bubbles inside reflect the incident light; it can be widely used for a surface lighting body, non-through-vision type window member, lamp shade, a sign board for edge lighting, various ornamental bodies, etc. For example, leading light to be incident on a surface of an organic foam glass plate of relatively low bubble density, the incident light is reflected in the direction perpendicular to the glass plate, and consequently, the overall surface of the plate emits light. In this way, it is suitably used as a surface lighting body for the purpose of revising a trace, Roentgen film (Preferably, mirrors are used to inhibit a loss of light in other surfaces of the plate).

Furthermore, the above-mentioned organic foam glass plate is cut out into an appropriate form, and the cutout is arranged in a cell in accordance with a character, figure, pattern, symbol or the like to be presented and then hardened after a molded material is poured into the cell. Thus, obtained is an organic glass plate for edge lighting where masses of bubbles are unevenly dispersed in accordance with the character, figure, etc. In this case, instead of burying the foam plate cut out into an appropriate form, the cutout may be affixed to the surface of a transparent inorganic or organic glass plate to obtain the same effects; thus, a productivity can be significantly improved compared with the method of burying the cutout of the foam plate.

Referring to FIG. 14 showing an example where a light reflecting body 1 carries a reflecting layer 5 on its rear surface, the light incident on a lower surface $2a$ of the body 1 takes a complex course in accordance with the incident angle. Specifically, with regard to the light advances in a transparent portion 2, a part of which incident angle to the surface is smaller than the critical angle (in polymethyl methacrylate, the critical angle to the air face $i_c = \sin 0.669 = 41$) is released to the system. The remaining part, however, are directed to bubbles 4 and then to the reflecting layer 5 and reflected. A part $L_2$ of which incident angle is larger than the critical angle is released from the system, while the remaining part $L_3$ takes a very complex course in which the whole is reflected at the interface. In any way, since the light, when directed to the bubbles and reflected by the bubbles, makes the bubbles shine, almost all the incident light is effectively used as illumination light. In addition to that, some of the light paths are long while some are short, and they complexly intersect each other; hence, as a whole, relatively uniform illuminance can be obtained. However, since the released light includes a large amount of polarized light, a light plate should be placed on a surface $2c$ or a light scattering plate is attached to relieve glittering.

Figure 6:
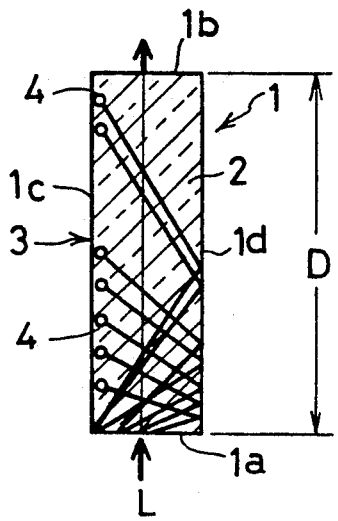
FIG. 6 is a schematic sectional view for explaining the principle of light reflection.

As for an example shown in FIG. 6 where the reflecting layer 5 shown in FIG. 14 does not exist, a loss of light somewhat increases; but, instead, it can be used as a dual-side light emitting body.

As a result of an experiment, not so much change can be observed in illuminance along an extension of distance D of about 50 cm from the face $2a$ on which the light is incident; it is found that an extension of distance D about 100 cm or less is allowable. This is because, as can be seen in FIG. 14, the light path in the body is very complex; the light paths directed to the front of the body are considerably different in length so that the light in those paths intersect each other. It should be noted, however, that the light source preferably covers the overall surface of the transparent portion 2 as much as possible. On the contrary, if the bubbles are dispersed uniformly in the transparent portion 2, the attenuation of the incident light is significant; assuredly, a product in this case can not be put to practice. Thus, regardless of whether the foam free transparent portion 2 are linear, the transparent portion 2 substantially serving as a light path is essential in an aspect of the purpose of the present invention.

Organic glass beads used according to the methods of the present invention contain a very small amount of air in their respective particles; additionally, a little air is attached to or adsorbed by minute cracks and voids in the surface. Thus, when the beads are added to a molded material, the accompanying air serves as a nuclei of bubbles as the beads dissolve or swell, and gradually larger bubbles are developed. In a well-known organic glass molding technique, the similar phenomenon probably occurs because of an addition of beads; however, in this usual method, there is positive pressurization in order to inhibit the generation of bubbles as much as possible. In this point, the inventive concept is different from that of the present invention where the hardening is intentionally carried out under an ordinary pressure and the development of bubbles is never inhibited.

So long as adequate conditions are allowable, a size and dispersion density of the generated bubbles are almost constant, and the inner walls of the bubbles are smooth. Consequently, the incident light is reflected evenly, so that the illuminance by edge lighting is constant, and excellent presentation or ornamentation effects can be obtained.

According to a method of superimposing a foam plate by means of the spreading, organic monomer in a thermosetting fluid mixture that has been spread over an organic glass plate and hardened into a layer dissolves a part of the surface of the organic glass plate to be completely integral with the organic glass plate. The bubbles in a foam layer formed by the spreading are almost right spherical in shape because a very small amount of air brought by the granular polymer that is added as a trigger turns to bubbles; the bubbles are all uniform in particle diameter. The thickness of the foam layer can be made substantially uniform by process control; hence, here is provided a very practical method of manufacturing a light reflective body. Because of employing the spreading method, there is no need of assembling and disassembling a cell; thus, cost on such labor can be considerably reduced. In addition to that, there are various merits on an industrial basis that substantially no restrictions are placed on dimensions of the molded light reflective body, that undesirable accidents in molding an organic glass plate can be prevented because a ready-made organic glass plate is used, that the expense on plate and equipment investment may be very small, etc.

Further, when a foam plate is tightly attached to an inorganic or organic glass plate by means of affixing, relatively uniform diameter and dispersion of bubbles and a smoothness of the inner walls of the bubbles are sufficient to attain reflection effects satisfactory in practical use.

DESCRIPTION OF THE PREFERRED EMBODIMENT

Now, various exemplary manufacturing methods and configurations of the preferred embodiments according to the present invention will be described in detail.

EMBODIMENT 1

Method 1 Using a Framework

Methyl methacrylate (MMA) monomer of 100 parts by weight is mixed with a polymerization initiator (AIBN), etc. of 0.1 parts by weight. The catalyst added monomer is mixed with granular polymethyl methacrylate (PMMA) of average particle diameter 270 $\mu$m (Sumitomo Chemical Co., Ltd. SUMIPEX® BMH, the identical material is used hereinafter) of 60 parts by weight and stirred in an open system. As the stir proceeds, the resin particles appear to gradually dissolve into a viscous slurry.

On the other hand, a single polished glass plate purified and dried in advance is prepared. In an arbitrary point where foaming is desired on the glass plate, a metal framework is positioned. The slurry is poured into the framework and left under the room temperature for a couple of hours to be coagulated into a gel which will stand alone without a support; thereafter, the framework is removed.

Another single polished glass plate purified and dried in advance is disposed through a polyvinyl chloride gasket in parallel with the above-mentioned glass plate to assemble a framework.

MMA monomer of 100 parts by weight and an additive agent like a polymerization initiator of 0.1 parts by weight are put into a preliminary polymerization bath and preliminarily polymerized at 65° C. for about 1 hour; thereafter, it is sucked under about 30 through 50 mmHg to deaerate, and consequently, syrup for molding is obtained. The syrup is poured from an inlet into the framework and the inlet is sealed. After deaeration, the syrup is polymerized in a constant temperature bath at 55° through 60° C., and then, subjected to a heat treatment in a constant temperature bath at 115° C. to complete the polymerization.

The resultant polymer is annealed by gradually cooling it down to 40° C.; thereafter, the framework is disassembled, and thus, a hardened organic glass plate (light reflective body of the present invention) is obtained. The periphery of the glass plate is cut off, and then the cutting edge is polished while cooled in water; thus, obtained is the intended light reflective body (see FIG. 2).

EMBODIMENT 2

Method 2 Using a Framework

MMA monomer of 100 parts by weight and a polymerization initiator, etc. of 0.1 parts by weight are mixed, and it is further mixed with the PMMA of average particle diameter 150 $\mu$m of 40 parts by weight and stirred into slurry in a container.

Then, the slurry is poured into a framework from which the MMA can be easily released, and left under the room temperature to be coagulated.

After the coagulation is completed, the coagulated object is cautiously released from the framework and mounted on a polished glass plate purified and dried in advance. Thus, a framework is assembled similar to the above example.

Additionally, MMA of 100 parts by weight and an additive agent like a polymerization initiator of 0.1 parts by weight are put into a preliminary polymerization bath and preliminarily polymerized at 65° C. for about 1 hour; thereafter, it is sucked under about 30 through 50 mmHg to deaerate, and consequently, syrup for molding is obtained. The resultant syrup is subjected to hardening and following treatments similar to the above example. Thus, the intended light reflective body (see FIG. 3) is obtained.

EMBODIMENT 3

Method 3 Using a Framework

MMA monomer of 100 parts by weight and a polymerization initiator, etc. of 0.1 parts by weight are mixed; and it is further mixed with the PMMA of particle diameter 400 $\mu$m of 70 parts by weight and stirred into slurry.

On the edge of a square polished glass plate purified and dried in advance, a metal framework identical in shape and size is placed. The slurry is poured into the framework up to the $\frac{1}{2}$ depth of the intended product and left under the room temperature to be coagulated; thereafter, the framework is removed.

After that, another glass plate and a gasket are used to assemble a framework as in Embodiment 1. Then, similar to the embodiment, the PMMA syrup preliminarily polymerized is poured into the framework and subjected to hardening and following treatments. Thus, the product of the light reflective body shown in FIG. 1 is obtained.

EMBODIMENT 4

Sample Product 1

Figure 7:
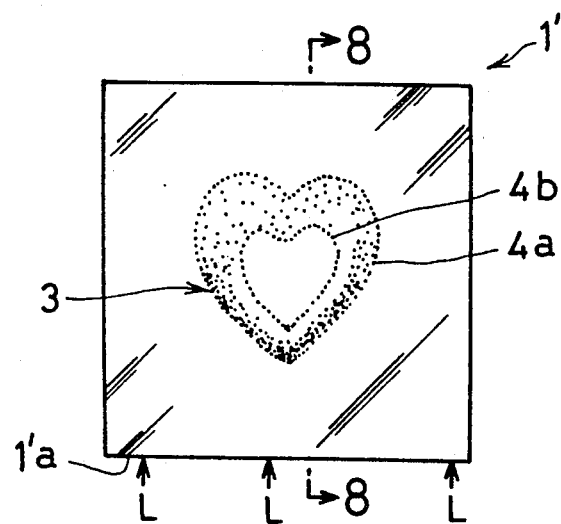
FIG. 7 is an elevational view showing an example of an ornamental body according to the present invention.

FIG. 7 is an elevational view showing an example of an ornamental light reflective body obtained in the ways discussed in Embodiments 1 and 2, while FIG. 8 is a sectional view taken along the line 8—8 of FIG. 7.

A product (ornamental plate) 1' of this embodiment is integrally formed of a square plate of colorless and transparent PMMA and a foam layer 3 of an open heart in shape in one surface of the PMMA plate.

When the ornamental plate 1' of this embodiment is illuminated from the lower surface 1'a by edge lighting, the open heart looming up with identical luminance through the darkness of the background assumes a dreamy beauty. If closely looked, however, observable in FIG. 7 are a clear ring of brilliant band 4a along the outer outline of the open heart and an indistinct ring of brilliant band 4a along the inner outline, where the degree of the brightness is expressed by a varied density of big and small dots while the range of the brilliance is expressed by the width of those dots; it does not seem irregular as a whole. As a light source, laser beams linearly disposed through optical fiber are suited most, but fluorescent light linearly narrowed down by a slit is sufficient in practice. An electroluminescent (EL) light emitting plate is not so suited to the light source because its luminous intensity is insufficient even if intensified by an inverter.

EMBODIMENT 5

Method 1 of Manufacturing Surface Reflective Body

MMA monomer of 100 parts by weight and a polymerization initiator, etc. of 0.1 parts by weight are mixed, and it is further mixed with the PMMA of particle diameter 400 μm of 70 parts by weight and stirred into slurry.

On the edge of a square polished glass plate purified and dried in advance, a metal framework identical in shape and size is placed. The slurry is poured into the framework up to the ½ depth of the intended product and left under the room temperature to be coagulated; thereafter, the framework is removed.

After that, another glass plate and a gasket are used to assemble a framework. The PMMA syrup preliminarily polymerized is poured into the framework and subjected to hardening and following treatments. Then, the resultant object is cut and polished in the periphery, and thus, as shown in FIG. 9, a molded plate of thickness 6 mm which has a foam layer 3 in one major surface (bottom surface in FIG. 9) is obtained.

Figure 9:
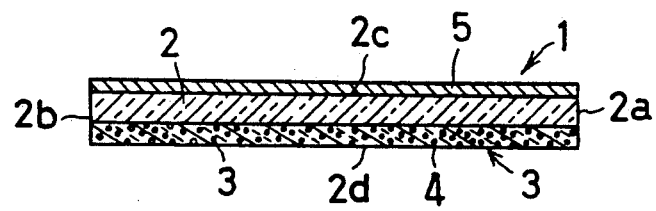
FIGS. 9 through 13 are schematic sectional views showing various configurations of a lighting body according to the present invention.
Figure 10:
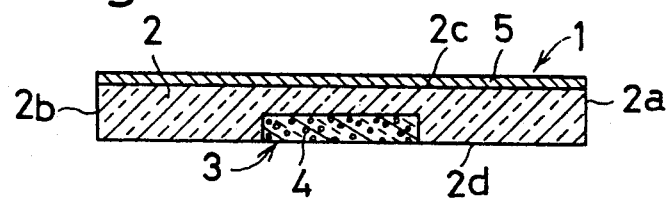
Figure 11:
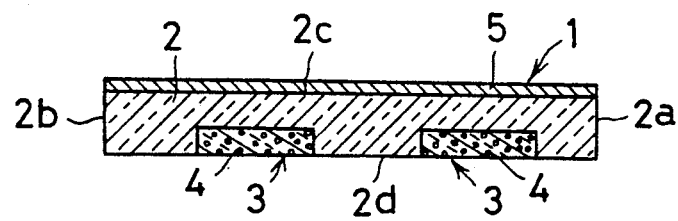
Figure 12:
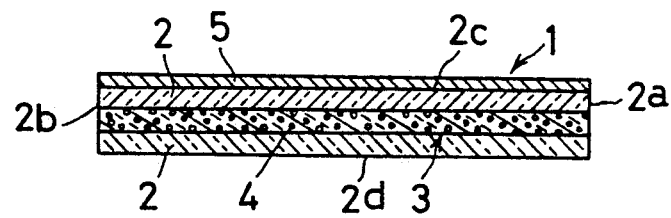
Figure 13:
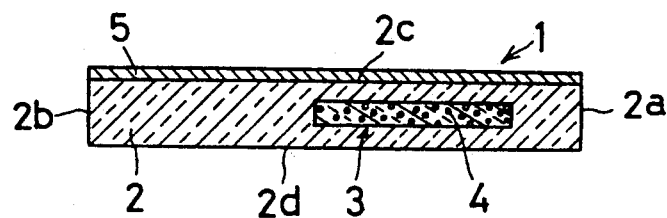

On the other major surface (upper surface in FIG. 9) of the resultant plate, an aluminum evaporated film layer 5 is formed in an ordinary way, and thus, a surface lighting body 1 as shown in FIG. 9 is obtained.

EMBODIMENT 6

Method 2 of Manufacturing Surface Reflective Body

In the above-mentioned Embodiment 5, a mirror 5' may be substituted for a metal layer deposited on the major surface of the foam plate by vacuum evaporation, and another mirror 5' is further affixed to a face except for the lower surface of the foam plate. Thus, a surface lighting body 1' is obtained.

EMBODIMENT 7

Sample 1 of Assembled Surface Light

A thin light scattering plate 6 is attached to one major surface of the surface lighting material 1' (150×150×9 mm) in Embodiment 6. This is fit in an opening 14 at the top of a house-shaped casing 13 of a light source 10 in which a cold cathode discharge tube 11, an extension high voltage supply equipment (not shown) and a parabolic reflecting mirror are provided. Thus, a surface lighting member 100 as shown in FIG. 15 is obtained.

Sample for Comparison

Figure 16A:
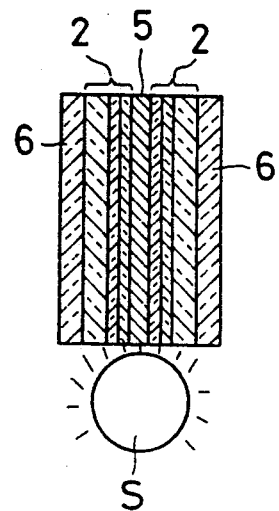
FIGS. 16A and 16B are a schematic cross-sectional view showing a surface lighting body used as a sample for comparison.
Figure 16B:
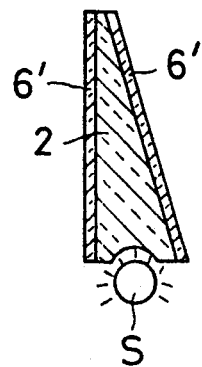

A comparison about a illuminance is made between the surface light 100 (light according to the present invention) and two types of surface lighting bodies A, B as shown in FIG. 16 which are commercially available under the condition of distance 100 mm between a light source S and them. Table-1 below shows the results.

TABLE 1

| Sample Characteristics | Light of the Invention | Compared Samples | |
|---|---|---|---|
| | | A* | B** |
| Illuminance Lx | >3000 | 500 | 2800 |
| Thickness mm | 9 | 27 | 10 |

*A: A one-layer reflective layer (of composite paper) 5 in the center portion has opposite surfaces overlaid on each side with three transparent light conducting plates 2 having minute convexities and concavities on one side by means of coating, which in turn are overlaid on its outermost plate with a single-layer light diffusing plate 6 (commercially available; see FIG. 16A)
**B: A transparent substrate, which is wedge-shaped in section, has a mirror on one surface. (commercially available)

EMBODIMENT 8

Sample 2 of Surface lighting Member

Figure 17:
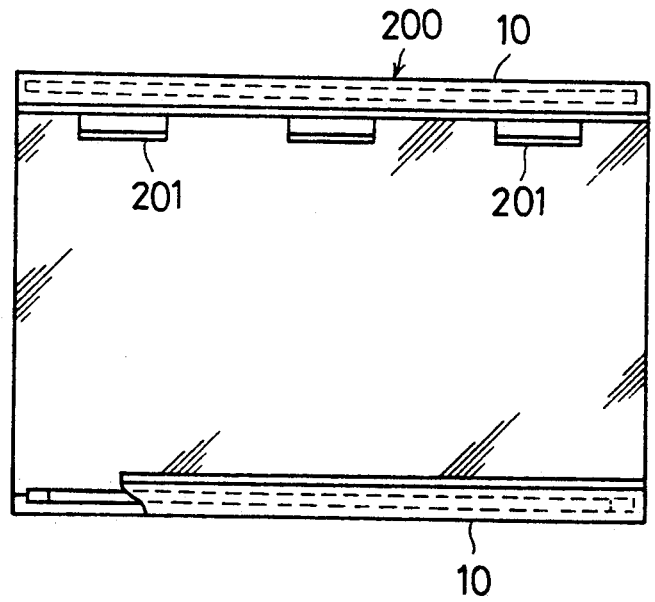
FIG. 17 is a partially cut away elevational view showing another example of the light according to the present invention.

FIG. 17 shows a device 200 for observing positive film, where a light source device 10 is attached in the upper portion of the light in Sample 1, while its lateral width is made larger.

The device in this embodiment is smaller in length and larger in illuminance compared with a prior art device of this kind. Reference numeral 201 denotes a clip for holding a negative.

EMBODIMENT 9

Method (a) of Manufacturing a Foam Organic Glass Plate

Methyl methacrylate (MMA) monomer of 100 parts by weight is mixed with an polymerization initiator (AIBN), etc. of 0.1 parts by weight, and then, it is sucked and and deaerated to about 30 mmHg. After that, the catalyst added monomer is mixed with granular polymethyl methacrylate (PMMA) of average particle diameter 270 μm (Sumitomo Chemical Co., Ltd. SUMIPEX ® BMH, the identical material is used hereinafter) of 60 parts by weight and stirred in an open system. As the stir proceeds, the resin particles gradually dissolve into viscous slurry so long as it looks.

Two polished glass plates purified and dried in advance are disposed in parallel at a inner interval 5 mm and are tightly closed by a polyvinyl chloride gasket to prepare a framework. The slurry is poured into the framework and then the inlet is sealed. After that, the slurry is polymerized in a constant temperature bath at 55°–60° C., and then, subjected to a heat treatment in a constant temperature bath at 120° C. to complete the polymerization. The resultant polymer is annealed by gradually cooling it down to 40° C.; thereafter, the framework is disassembled, and then, a hardened organic foam glass plate (coarse plate of the present invention) is obtained. The periphery of the glass plate is cut off, and then the cutting edge is polished while cooled in water; thus, obtained is the intended organic foam glass plate.

In the foam plate, bubbles each of which is about 1 mmφ in average diameter are uniformly dispersed. The foam plate, as it is, can be used for a surface lighting body, shade, a non-through-vision-type window member; the foam plate, when cut with a laser cutter, can be used for the sign member having the shape of a character, symbol, figure, etc. in an ornamental plate or display board for edge lighting.

EMBODIMENT 10

Method (b) of Manufacturing a Foam Organic Glass Plate

Methyl Methacrylate (MMA) monomer of 100 parts by weight, AIBN of 0.1 parts by weight and another additive agent are mixed, stirred and dissolved in a framework similar in Embodiment 9; and then, a molded material is poured therein after deaeration. PMMA beads used in Embodiment 1 are successively poured from the upper opening of the framework to fill the framework up to 95% of its height; then, the opening of the framework is sealed.

After the mixture in the framework is preliminarily polymerized in a constant temperature bath fixed at 55° through 60° C., a polymerization is completed in a heated air circulating oven at 120° C. After that, the mixture in the framework is gradually cooled down to 40° C. for annealing.

Then, the cast is disassembled, and the resultant molded body is taken out and cut in the periphery in an ordinary way. Thus, the intended organic foam glass plate is obtained.

EMBODIMENT 11

Method (c) of Manufacturing a Foam Organic Glass Plate

After the framework similar in Embodiment 9 is filled with the beads used in Embodiment 1, the opening is sealed. Then, a small hole is made in an upper gasket, and a nozzle for deaerating is fit into the hole for deaeration. After that, cold MMA monomer (mixed with an additive agent, such as AIBN and the like) is poured through the nozzle, and the hole is sealed. Then, a polymerization is carried out in the same manner as in the previous embodiments. Thus, the desired foam organic glass plate is obtained.

EMBODIMENT 12

Manufacturing Method 1 by means of Spreading

Methyl methacrylate (MMA) monomer of 100 parts by weight is mixed with a polymerization initiator (AIBN), etc. of 0.002 parts by weight.

Then, the catalyst added monomer is heated and preliminarily polymerized into a prepolymer of viscosity 50 through 100 cp. Then, an polymerization initiator, etc. of 0.1 parts by weight is added to it.

Granular PMMA (Sumitomo Chemical Co., Ltd. SUMIPEX® BMH) of average particle diameter 270 μm of 60 parts by weight is added to the above-mentioned prepolymer composite material and mixed into slurry for a foam layer.

The slurry is quietly spread over a PMMA plate (thickness 5 mm × length 600 mm × width 400 mm) purified, dried in advance and horizontally set, and left for a while so that large bubbles created when the slurry is spread can come up to the surface and vanish. After that, the PMMA plate is covered with another PMMA plate of the same size and left as it is for 1 hour under the room temperature. Thus, PMMA particles in the slurry are swelled and dissolved, so that the whole comes to be gelled agar without fluidity. The assembly like sandwich is forced to go through two rollers disposed with 11 mm gap therebetween and pressed. After that, the assembly is subjected to a heat treatment; first in an oven at 65° C. for 3 hours, and then at 120° C. for 1 hour. Thus, obtained is the foam organic glass plate (light reflective body) having a configuration like sandwich where a foam layer of thickness 1 mm (charged bubble is 0.3–1.0 mmφ in diameter) is interposed between organic glass plates of thickness 5 mm.

EMBODIMENT 13

Manufacturing Method 2 by Means of Spreading

MMA monomer of 100 parts by weight is mixed with a polymerization initiator (AIBN), etc. of 0.002 parts by weight.

The catalyst added monomer is heated and preliminarily polymerized into prepolymer, and thereafter, it is diluted by MMA monomer to regulate the viscosity to 100 cp. Then, a polymerization initiator, etc. of 0.1 parts by weight is further added to it.

A pattern is drawn with an injector containing the prepolymer which has been already regulated in viscosity on a PMMA plate (thickness 8 mm × length 300 mm × width 300 mm) purified, dried in advance and horizontally set.

Then, granular PMMA similar to those used in Embodiment 1 is sprinkled over the drawn pattern; thus, resin particles is precipitated into a prepolymer layer.

After that, the whole is heated in $N_2$ atmosphere at 65° C. for 3 hours, then at 120° C. for 30 minutes to complete the polymerization. Thus, obtained is the intended organic glass plate having a patterned foam layer.

EMBODIMENT 14

Sample Ornament

Figure 23:
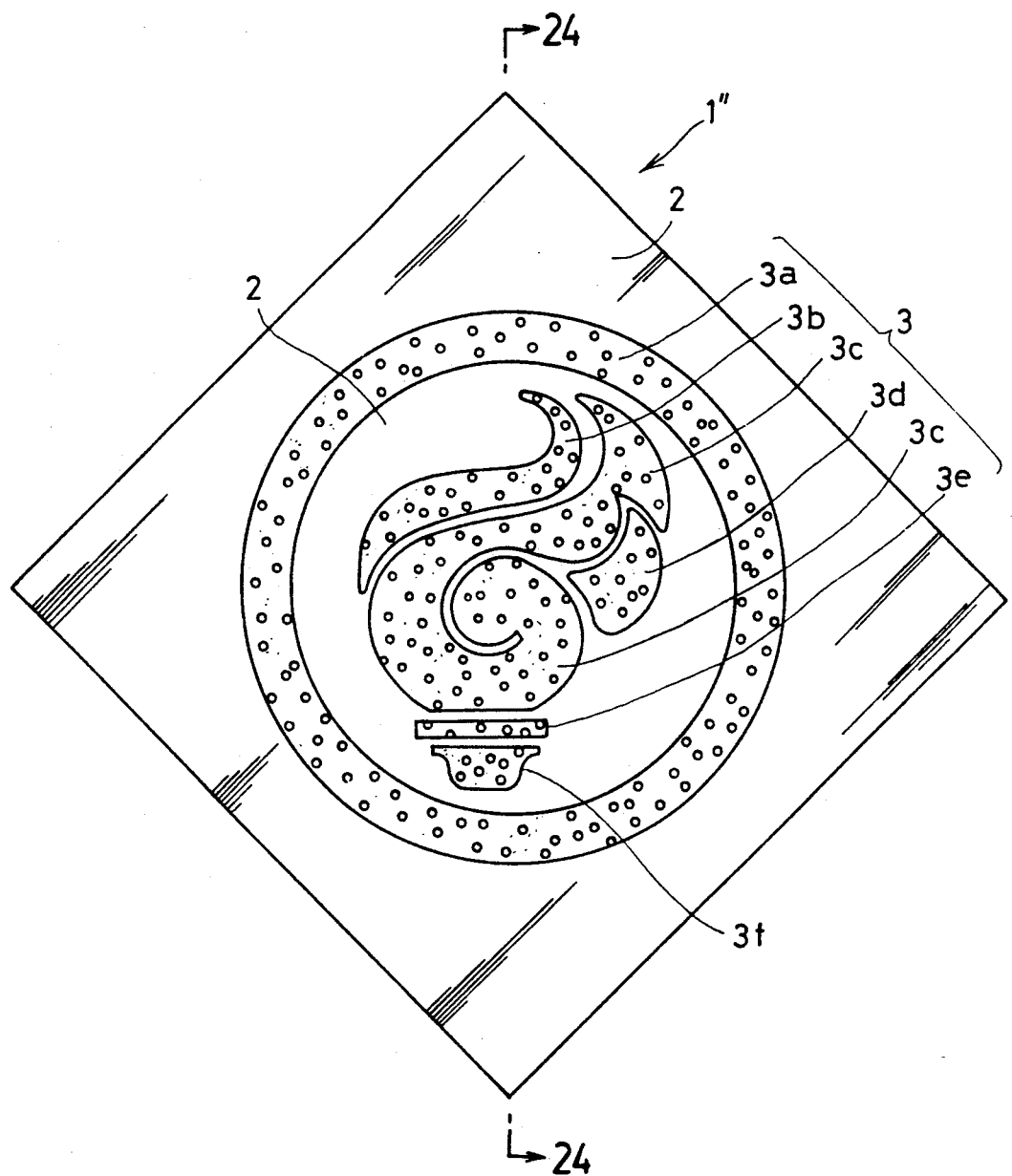
FIG. 23 is a plan view showing an example of an ornamental plate to which a foam plate is affixed.
Figure 24:
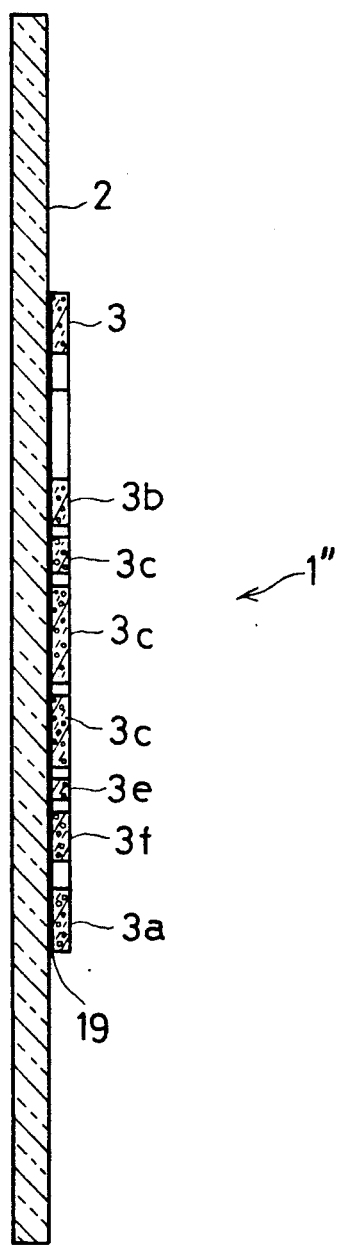
FIG. 24 is a sectional view taken along the line 24—24 of FIG. 23.

FIG. 23 is a plan view showing an embodiment of the present invention, while FIG. 24 is a sectional view taken along the line 24—24 of FIG. 23.

An ornamental plate 1" is composed of a transparent resin plate 2 of polymethyl methacrylate and a foam plate assembly 3 bonded to one major surface of the resin plate by an acrylic adhesive agent. The foam plate assembly 3 is further composed of an annular unit foam plate 3a and unit foam plates 3b–3f of different shapes disposed closer to the center portion, all of which make a pattern representing a torch encircled by a ring.

When the ornamental plate 1" is subjected to edge lighting, the foam plate 2 makes a beautiful figure of the torch loom up.

The numeral 19 is allotted to denote a transparent adhesive layer.

As has been described, the present invention provides a novel light reflecting body excellent in surface smoothness and light diffusivity and emitting beautiful and strong scattering light by edge lighting, and further provides a surface lighting body and ornamental body employing the same. Thus, applying the present invention to a back light for a display, a sign board, an ornamental body, a liquid crystal display or a television monitor, a shadeless lamp for surgical operation, a light for observingly or appreciatively looking over negative and positive films, a light for copying drafts and animation original drawings, etc., all of which employs edge lighting, a great contribution to the development of the related industry and the interests of user.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A method of manufacturing a foam transparent organic glass plate which contains masses of many small evenly dispersed bubbles comprising the following steps;

mixing a fluid organic glass material selected from the group consisting of an organic glass monomer, a prepolymer thereof, and a mixture of said organic glass monomer and said prepolymer with organic glass beads formed of said monomer in which said glass beads contain a small amount of air within the beads with air attached to or absorbed by minute cracks and voids in their surface, permitting the mixture obtained in the above step to change to a gelled mixture which contains masses of many small bubbles dispersed, maintaining an even density of organic glass beads in the mixture along a length of said glass plate, and polymerizing and hardening the gelled mixture by subjecting the organic glass material therein to heat.

2. A method according to claim 1, wherein the evenly dispersed density of organic glass beads in the mixture is obtained by stirring.

3. A method according to claim 2, wherein a ratio of fluid organic glass material to organic glass beads is from about 70:30 through about 20:80.

4. A method according to claim 1, wherein the evenly dispersed density of organic glass beads in the mixture is obtained by filling any gaps between the organic glass beads with the fluid organic glass material which is tightly bound in a cell.

5. A method according to claim 4, wherein a ratio of fluid organic glass material to organic glass beads is from about 70:30 through about 20:80.

6. A method according to claim 1, wherein a ratio of fluid organic glass material to organic glass beads is from about 70:30 through about 20:80.

7. A method of manufacturing a light reflective transparent body which contains at least one part comprising a foam transparent organic glass having masses of many small evenly dispersed bubbles therein comprising the following steps;

mixing a fluid organic glass material selected from the group consisting of an organic glass monomer, a prepolymer thereof and a mixture of said monomer and said prepolymer with organic glass beads formed of said monomer, said glass beads contain a small amount of air within the beads with air attached to or absorbed by minute cracks and voids in their surface, permitting the mixture obtained in the above step to change to a gelled mixture which contains masses of many small dispersed bubbles while maintaining an even density of organic glass beads in the mixture and polymerizing and hardening integrally the gelled mixture obtained in the second step with a fluid organic glass material in a cast by subjecting the organic glass material to heat.

8. A method according to claim 7, wherein the density of the organic glass beads in the mixture is kept even by stirring in the second step.

9. A method according to claim 8, wherein a ratio of fluid organic glass material to organic glass beads in the first step is from about 70:30 through about 20:80.

10. A method according to claim 7, wherein the density of organic glass beads in the mixture is kept even by filling fluid organic glass material into gaps between the organic glass beads formed together tightly in a cell.

11. A method according to claim 10, wherein a ratio of fluid organic glass material to organic glass beads in the first step is from about 70:30 through about 20:80.

12. A method according to claim 7, wherein a ratio of fluid organic glass material to organic glass beads in the first step is from about 70:30 through about 20:80.

13. A method according to claim 7, wherein the gelled mixture is arranged to have any shape.

* * * * *